US011838641B2

(12) United States Patent
Afifi et al.

(10) Patent No.: US 11,838,641 B2
(45) Date of Patent: Dec. 5, 2023

(54) NETWORK FOR CORRECTING OVEREXPOSED AND UNDEREXPOSED IMAGES

(71) Applicant: SAMSUNG ELECTRONICS CO., LTD., Suwon-si (KR)

(72) Inventors: Mahmoud Nasser Mohammed Afifi, Toronto (CA); Michael Scott Brown, Toronto (CA); Konstantinos Derpanis, Toronto (CA); Björn Ommer, Heidelberg (DE)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 365 days.

(21) Appl. No.: 17/131,262

(22) Filed: Dec. 22, 2020

(65) Prior Publication Data

US 2021/0289115 A1   Sep. 16, 2021

Related U.S. Application Data

(60) Provisional application No. 62/988,373, filed on Mar. 11, 2020.

(51) Int. Cl.
| | | |
|---|---|---|
| *H04N 23/00* | (2023.01) | |
| *H04N 23/70* | (2023.01) | |
| *G06N 3/08* | (2023.01) | |
| *G06T 5/00* | (2006.01) | |
| *G06N 3/048* | (2023.01) | |

(52) U.S. Cl.
CPC .............. *H04N 23/70* (2023.01); *G06N 3/048* (2023.01); *G06N 3/08* (2013.01); *G06T 5/007* (2013.01); *G06T 2207/20084* (2013.01)

(58) Field of Classification Search
CPC ........ H04N 23/70; H04N 23/64; H04N 23/07; G06N 3/048; G06N 3/08; G06N 3/045; G06T 5/007; G06T 2207/20084
See application file for complete search history.

(56) References Cited

U.S. PATENT DOCUMENTS

| | | | |
|---|---|---|---|
| 8,736,723 B2 | 5/2014 | Tsuruoka | |
| 9,288,374 B1 * | 3/2016 | Cooper | ................ H04N 23/745 |
| 9,667,879 B1 | 5/2017 | Goyal et al. | |
| 10,007,986 B2 * | 6/2018 | Wu | ......................... G06T 7/262 |
| 11,037,278 B2 * | 6/2021 | Zamir | ...................... G06T 5/40 |

OTHER PUBLICATIONS

Lin et al, Deep Single Image Enhancer, 2019 16th IEEE International Conference on Advanced Video and Signal Based Surveillance (AVSS) (pp. 1-7 (Year: 2019).*

(Continued)

*Primary Examiner* — Ping Y Hsieh
*Assistant Examiner* — Xiao Liu
(74) *Attorney, Agent, or Firm* — Sughrue Mion, PLLC

(57) ABSTRACT

A method for generating an output image may include obtaining an input image having a first exposure value, generating a plurality of levels that are each respectively associated with a respective representation of the input image, based on the input image, generating the output image having a second exposure value, based on a deep neural network (DNN) including a set of sub-networks and the plurality of levels, and providing the output image.

20 Claims, 8 Drawing Sheets

(56) References Cited

OTHER PUBLICATIONS

Zhang et al, Kindling the darkness, MM '19, Oct. 21-25, 2019, Nice, France, pp. 1632-1640 (Year: 2019).*
Denton et al, Deep-generative-image-models-using-a-laplacian-pyramid-of-adversarial-networks, Part of Advances in Neural Information Processing Systems 28 (NIPS). (Year: 2015).*
Dong et al arXiv:1901.08753v1 Towards a deeper understanding of a adversarial losses (Year: 2019).*
Wikipedia: Exposure value (Year: 2023).*
Fu et al, Lightweight Pyramid Networks for Image Deraining, arXiv:1805.06173v1 May 16 (Year: 2018).*
Lai et al, Deep Laplacian Pyramid Networks for Fast and Accurate Super-Resolution, CVPR (Year: 2017).*
Qiu et al, Unsupervised Representation Learning with Laplacian Pyramid Auto-encoders, arXiv:1801.05278v2 May 12 (Year: 2018).*
Afifi, M., et al., "Learning to Correct Overexposed and Underexposed Photos", arXiv:2003.11596v1 [eess.IV], Mar. 25, 2020, pp. 1-23 (24 pages).

\* cited by examiner

NETWORK FOR CORRECTING OVEREXPOSED AND UNDEREXPOSED IMAGES

CROSS-REFERENCE TO RELATED APPLICATION(S)

This application is based on and claims priority under 35 U.S.C. § 119 to U.S. Provisional Patent Application No. 62/988,373, filed on Mar. 11, 2020, in the U.S. Patent & Trademark Office, the disclosure of which is incorporated by reference herein in its entirety.

BACKGROUND

1. Field

The disclosure relates to a system and method for generating training data representing underexposed, properly exposed, and overexposed images; training a network for correcting overexposed and underexposed images using the generated training data; and generating an output image using the trained network. A user device (e.g., a smartphone) may use the trained network to generate an output image having an improved exposure.

2. Description of Related Art

Capturing images with incorrect exposures remains a major source of error in camera-based imaging. Exposure problems are categorized as either: (i) overexposed, where the camera exposure was too long, resulting in bright and washed-out image regions, or (ii) underexposed, where the exposure was too short, resulting in dark regions. Both underexposure and overexposure greatly reduce the contrast and visual appeal of an image.

The exposure used at capture time directly affects the overall brightness of the final rendered photograph. Digital cameras control exposure using three main factors: (i) capture shutter speed, (ii) f-number, which is the ratio of the focal length to the camera aperture diameter, and (iii) the ISO value to control the amplification factor of the received pixel signals. In photography, exposure settings are represented by exposure values (EVs), where each EV refers to different combinations of camera shutter speeds and f-numbers performed automatically in an auto-exposure (AE) mode. When AE is used, cameras adjust the EV to compensate for low/high levels of brightness in the captured scene using through-the-lens (TTL) metering that measures the amount of light received from the scene that result in the same exposure effect, which is also referred to as "equivalent exposures' in photography.

Digital cameras can adjust the exposure value of captured images for the purpose of varying the brightness levels. This adjustment can be controlled manually by users or performed automatically in an auto-exposure (AE) mode. When AE is used, cameras adjust the EV to compensate for low/high levels of brightness in the captured scene using through-the-lens (TTL) metering that measures the amount of light received from the scene.

Exposure errors can occur due to several factors, such as errors in measurements of TTL metering, hard lighting conditions (e.g., very low lighting and very strong backlighting), dramatic changes in the brightness level of the scene, or errors made by users in the manual mode. Such exposure errors are introduced early in the capture process and are thus hard to correct after rendering the final mage. This is due to the highly nonlinear operations applied by the camera image signal processor (ISP) afterwards to render the final standard red, green, blue (RGB) (sRGB) image.

Exposure errors result in either very bright image regions, due to overexposure, or very dark regions, caused by underexposure errors, in the final rendered images. Correcting images with such errors is a challenging task even for well-established image enhancement software packages. Although both overexposure and underexposure errors are common in photography, most prior work is mainly focused on correcting underexposure errors or generic quality enhancement.

SUMMARY

According to an aspect of an example embodiment, a method for generating an output image may include obtaining an input image having a first exposure value; generating a plurality of levels that are each respectively associated with a respective representation of the input image, based on the input image; generating the output image having a second exposure value, based on a deep neural network (DNN) including a set of sub-networks and the plurality of levels; and providing the output image.

According to an aspect of an example embodiment, a device for generating an output image may include a memory configured to store instructions; and a processor configured to execute the instructions to obtain an input image having a first exposure value; generate a plurality of levels that are each respectively associated with a respective representation of the input image, based on the input image; generate the output image having a second exposure value, based on a deep neural network (DNN) including a set of sub-networks and the plurality of levels; and provide the output image.

According to an aspect of an example embodiment, a non-transitory computer-readable medium may store one or more instructions that, when executed by one or more processors of a device for generating an output image, cause the one or more processors to obtain an input image having a first exposure value; generate a plurality of levels that are each respectively associated with a respective representation of the input image, based on the input image; generate the output image having a second exposure value, based on a deep neural network (DNN) including a set of sub-networks and the plurality of levels; and provide the output image.

The DNN may be trained using a plurality of training images that correspond to a same underlying image, and that respectively include different exposure values.

The set of sub-networks of the DNN may be trained using a plurality of levels that respectively correspond to the plurality of training images, and that that are each respectively associated with a respective representation of respective training images.

The DNN may be trained using a first loss function that reduces a difference between the plurality of training images and respective outputs of the DNN.

Each sub-network of the DNN may be trained using a set of second loss functions that reduce respective differences between the plurality of Laplacian pyramids and respective outputs of the set of sub-networks.

The DNN may be trained using a third loss function that is an adversarial loss function.

The different exposure values may be set based on at least one of a market requirement, a customer preference, and a device setting.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Figure 1:
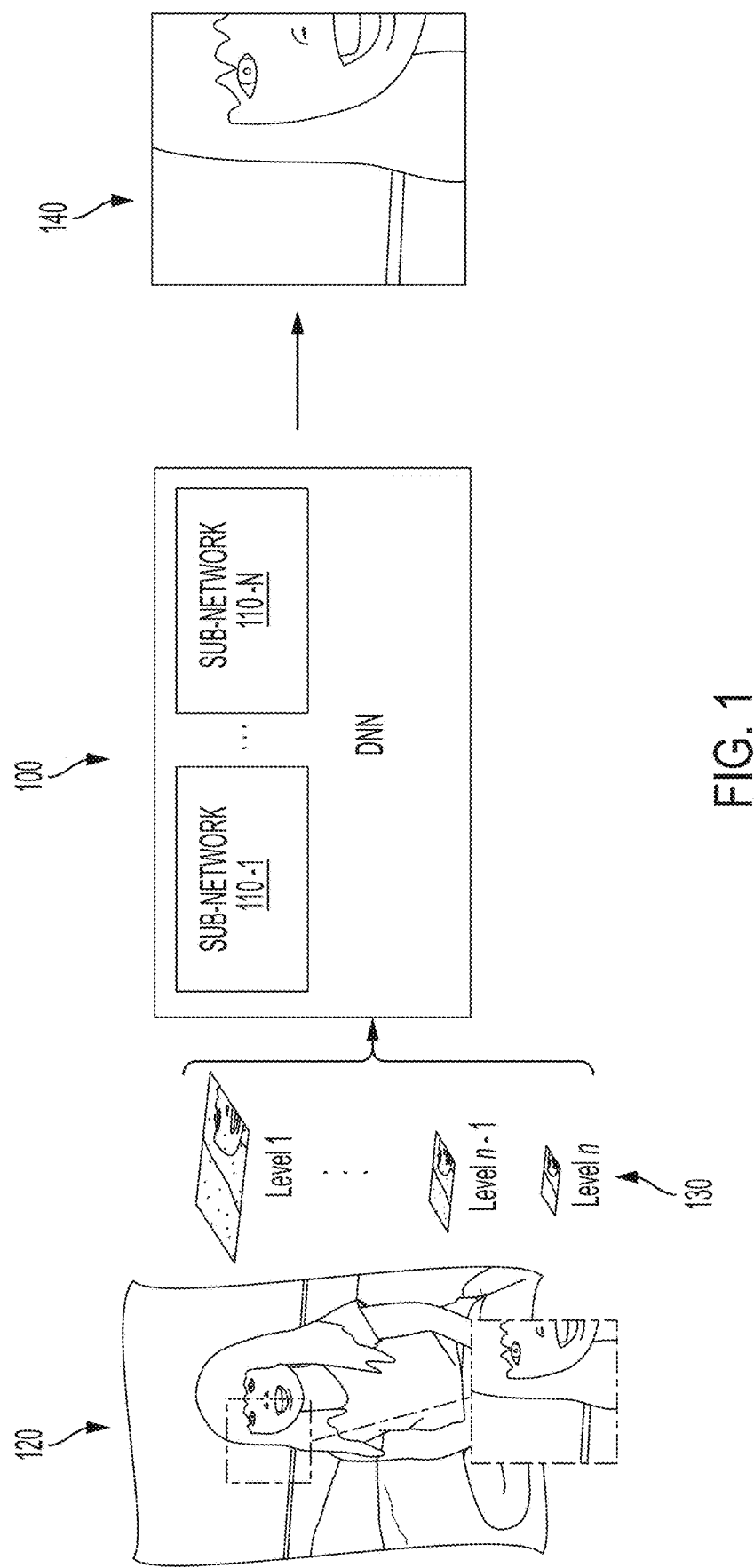
FIG. 1 is a diagram of a system for training a network for correcting overexposed and underexposed images, and generating an output image using the network according to an embodiment.

FIG. 1 is a diagram of a system for training a network for correcting overexposed and underexposed images, and generating an output image using the network according to an embodiment.

As shown in FIG. 1, a user device (e.g., a smartphone) may store a deep neural network (DNN) 100 that includes sub-network 1 through sub-network n. The deep neural network (DNN) 100 may obtain an input image 120 having a first exposure value. For example, a user of the user device may capture an image using a camera of the user device, and the input image 120 may be input to the DNN 100. The first exposure value may be not be desirable insofar as the first exposure value may include relatively more exposure error than as compared to other potential exposure values.

Based on the input image 120, the DNN 100 may generate a plurality of levels 130 that are each respectively associated with a respective representation of the input image 120. For example, the DNN 100 may generate a Laplacian pyramid, and the levels 130 may be levels of the Laplacian pyramid.

As further shown in FIG. 1, the DNN 100 may generate an output image 130 having a second exposure value. For example, the DNN 100 may input the respective levels 130 into respective sub-networks 110, and generate an output image 130 having a second exposure value that includes less exposure error than as compared to the first exposure value.

The user device 210 may provide the output image for display. In this way, some implementations herein permit a user device to capture an input image, and generate an output image having improved exposure using a DNN.

Figure 2:
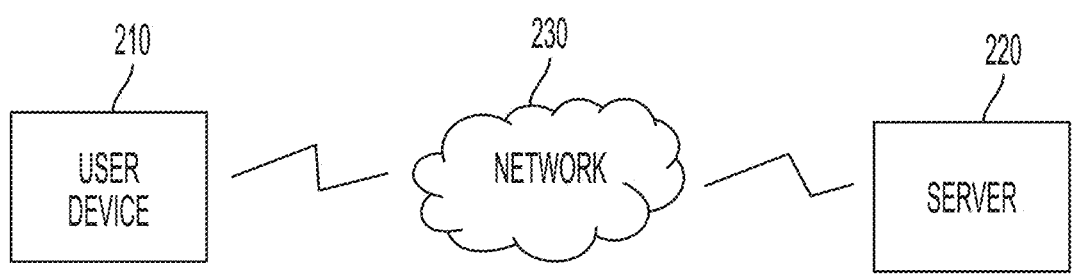
FIG. 2 is a diagram of devices of the system for training a network for correcting overexposed and underexposed images, and generating an output image using the network according to an embodiment.

FIG. 2 is a diagram of devices of the system for training a network for correcting overexposed and underexposed images, and generating an output image using the network according to an embodiment. FIG. 2 includes a user device 210, a server 220, and a network 230. The user device 210 and the server 220 may interconnect via wired connections, wireless connections, or a combination of wired and wireless connections.

The user device 210 includes one or more devices configured to generate an output image. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a camera device, a wearable device (e.g., a pair of smart glasses or a smart watch), or a similar device.

The server 220 includes one or more devices configured to train a network for correcting overexposed and underexposed images. For example, the server 220 may be a server, a computing device, or the like. The server 220 may train a network for correcting overexposed and underexposed images, and provide the trained network to the user device 210 to permit the user device 210 to generate an output image using the network.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
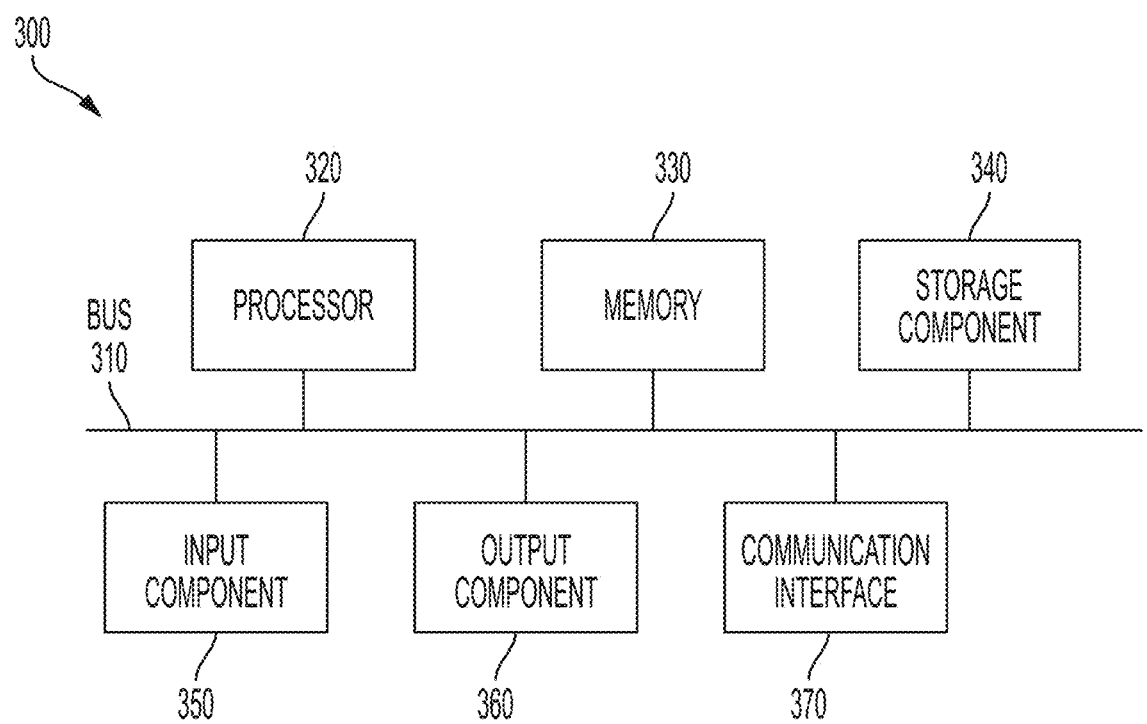
FIG. 3 is a diagram of components of the devices of FIG. 2 according to an embodiment.

FIG. 3 is a diagram of components of one or more devices of FIG. 2 according to an embodiment. Device 300 may correspond to the user device 210 and/or the server 220.

As shown in FIG. 3, the device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Process 320 includes one or more processors capable of being programmed to perform a function.

Memory 330 includes a random access memory (RAM), a read only memory (ROM), and/or another type of dynamic or static storage device (e.g., a flash memory, a magnetic memory, and/or an optical memory) that stores information and/or instructions for use by the processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits the device 300 to receive information, such as via user input (e.g., a touch screen display, a keyboard, a keypad, a mouse, a button, a switch, and/or a microphone). The input component 350 may include a sensor for sensing information (e.g., a global positioning system (GPS) component, an accelerometer, a gyroscope, and/or an actuator).

Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables the device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. The device 300 may perform these processes based on the processor 320 executing software instructions stored by a non-transitory computer-readable medium, such as the memory 330 and/or the storage component 340. A computer-readable medium is defined herein as a non-transitory memory device. A memory device includes memory space within a single physical storage device or memory space spread across multiple physical storage devices.

Software instructions may be read into the memory 330 and/or the storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
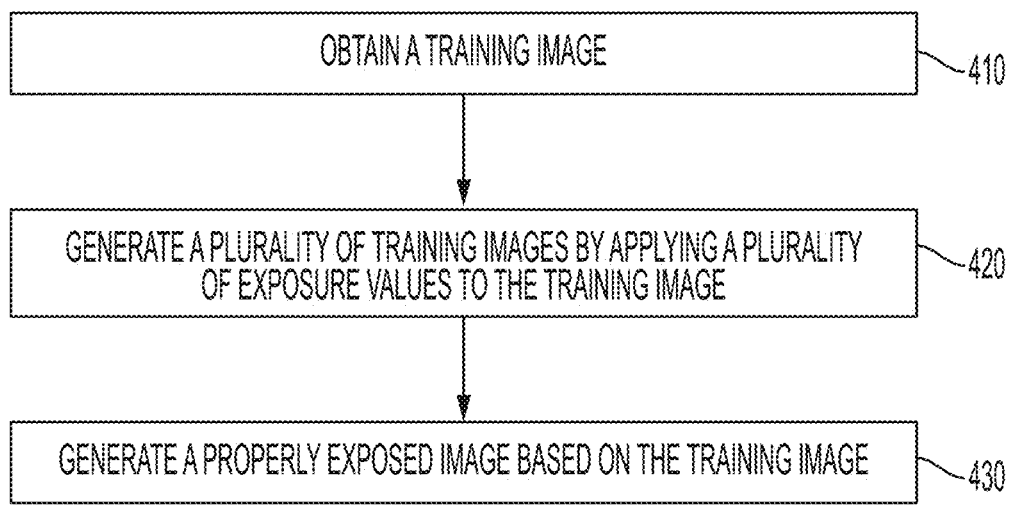
FIG. 4 is a flowchart of an example process for generating training data for training a network for correcting overexposed and underexposed images according to an embodiment.

FIG. 4 is a flowchart of an example process for generating training data for training a network for correcting overexposed and underexposed images according to an embodiment. According to some embodiments, one or more operations of FIG. 4 may be performed by the server 220. Additionally, or alternatively, one or more operations may be performed by the user device 210.

As shown in FIG. 4, the process may include obtaining a training image (operation 410). For example, the server 220 may obtain a training image in order to generate a plurality of training images having different EVs. The training image may be a raw-RGB image. For example, and referring to FIG. 5, the server 220 may obtain a training image 500 that is a raw-RGB image. The server 220 may obtain any number of training images for generating training data. For example, the server 220 may obtain hundreds, thousands, millions, etc. of training images. The server 220 may obtain the training images based on receiving the training images another device, based on obtaining the training images from storage, based on performing a web-mining technique, or the like.

As further shown in FIG. 4, the process may include generating a plurality of training images by applying a plurality of exposure values to the training image (operation 420). For example, the sever 220 may generate a plurality of training images by applying different EVs to the training image. As an example, the server 220 may emulate the nonlinear camera rendering process using metadata embedded in a digital negative (DNG) raw file of the training image. Further, the server 220 may render the training image with different EVs to mimic exposure errors. For example, the server 220 may use relative EVs of −1.5, −1, +0, +1, and +1.5 to render training images with underexposure errors, a zero gain of the original EV, and overexposure errors. The zero-gain relative EV may be equivalent to the original exposure settings applied onboard a camera of the user device 210 during capture time.

Each of the plurality of training images may correspond to the same underling image, and may each have different exposure values. For example, and referring to FIG. 5, the server 220 may generate a training image 510 having an exposure value of +1.5, a training image 520 having an exposure value of +1, a training image 530 having an exposure value of +0, a training image 540 having an exposure value of −1, and a training image 550 having an exposure value of −1.5 by applying the different exposure values to the training image 500.

As further shown in FIG. 4, the process may include generating a properly exposed image based on the training image (operation 430). For example, the server 220 may generate a properly exposed image by applying a particular EV to the training image. For example, and referring to FIG. 5, the server 220 may generate a properly exposed image 560 by applying a particular exposure value to the training image 500.

The "properly exposed" training image may refer to an image that does not exhibit underexposure or overexposure errors, or exhibits relatively less error than as compared to other training images. The properly exposed training image may have an exposure error value that satisfies a threshold. The properly exposure training image may have an exposure value of +0 EV, but may also have different EVs in some implementations.

Although FIG. 4 shows example operations, the method may include additional operations, fewer operations, different operations, or differently arranged operations than those depicted in FIG. 4. Additionally, or alternatively, two or more of the operations of the method may be performed in parallel.

Figure 6:
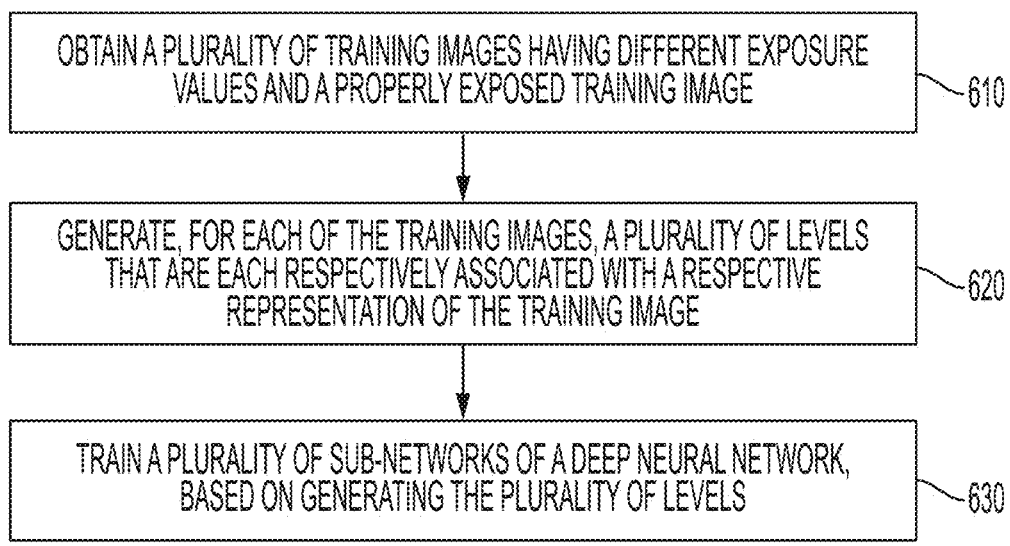
FIG. 6 is a flowchart of training a network for correcting overexposed and underexposed images according to an embodiment.

FIG. 6 is a flowchart of training a network for correcting overexposed and underexposed images according to an embodiment.

Figure 5:
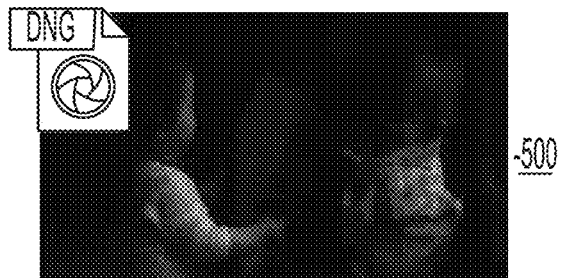
FIG. 5 is a diagram of training data according to an embodiment.
Figure 5:
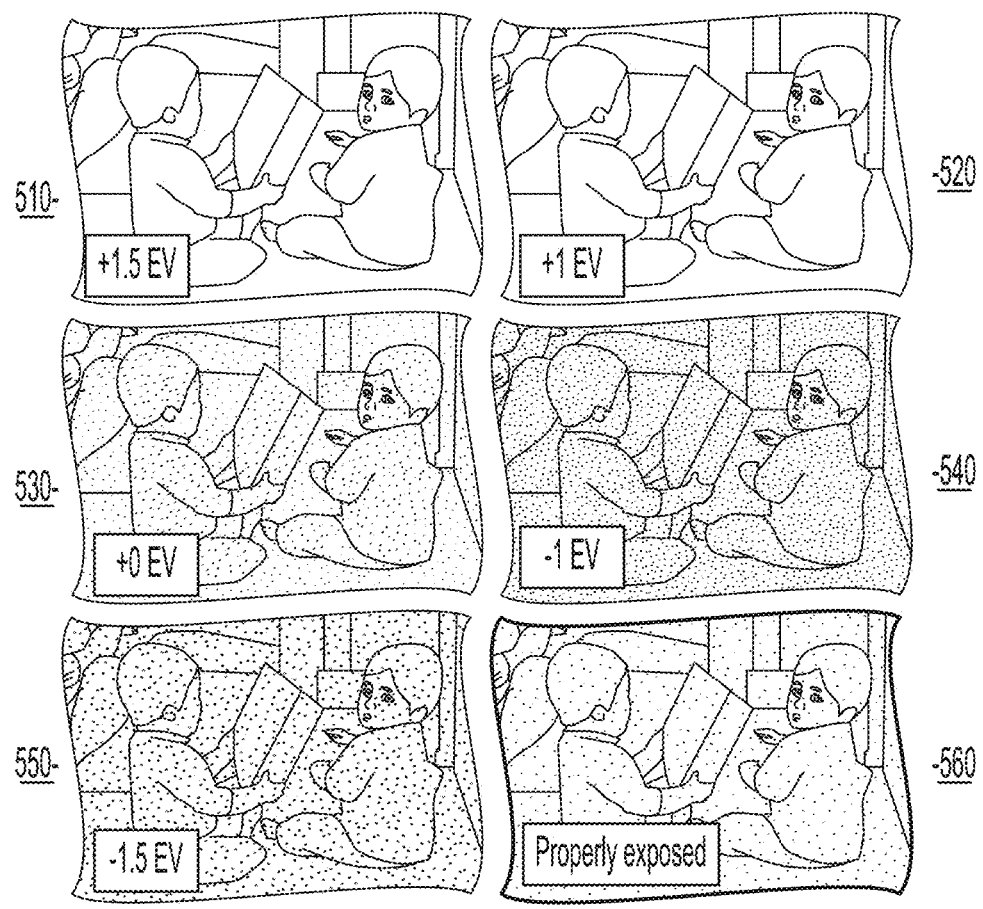

As shown in FIG. 6, the process may include obtaining a plurality of training images having different exposure values and a properly exposed training image (operation 610). For example, the server 220 may obtain the plurality of training images as described above in connection with FIG. 4 and as shown in FIG. 5.

As further shown in FIG. 6, the process may include generating, for each of the training images, a plurality of levels that are each respectively associated with a respective representation of the training image (operation 620). For example, the server 220 may generate a plurality of levels for a training image based on performing an image processing technique. For example, the server 220 may perform a Laplacian pyramid technique, a Gaussian pyramid technique, a steerable pyramid technique, a discrete Fourier and discrete cosine transform technique, a singular value decomposition technique, a wavelet transform technique, or the like.

Referring to FIG. 6, the server 220 may obtain an input training image 700, and generate a Laplacian pyramid 705. The Laplacian pyramid may include n levels. For example, as shown, the Laplacian pyramid 705 may include a first level 710, an n−1th level 715, and an n-th level 720.

The n-th level 720 captures low-frequency information of the input training image 700, and the first level 710 captures high-frequency information. The frequency levels may be categorized into global color information of the input training image 700 stored in the low-frequency n-th level 710, and coarse-to-fine details stored in the mid-frequency and high-frequency levels. The levels are used to reconstruct a full-color output image of the input training image 700.

As further shown in FIG. 6, the process may include training a plurality of sub-networks of a deep neural network, based on generating the plurality of levels (operation 630). For example, the server 220 may train a plurality of sub-networks of a deep neural network (DNN) using the plurality of training images.

The DNN may be configured to obtain an input image, and generate an output image having improved exposure as compared to the input image. For example, the DNN may obtain an input image having a first exposure value, and generate an output image having a second exposure value that exhibits reduced exposure error as compared to the input image. The DNN may include n sub-networks. For example, the DNN may include two, three, five, seven, etc. sub-networks.

Figure 7:
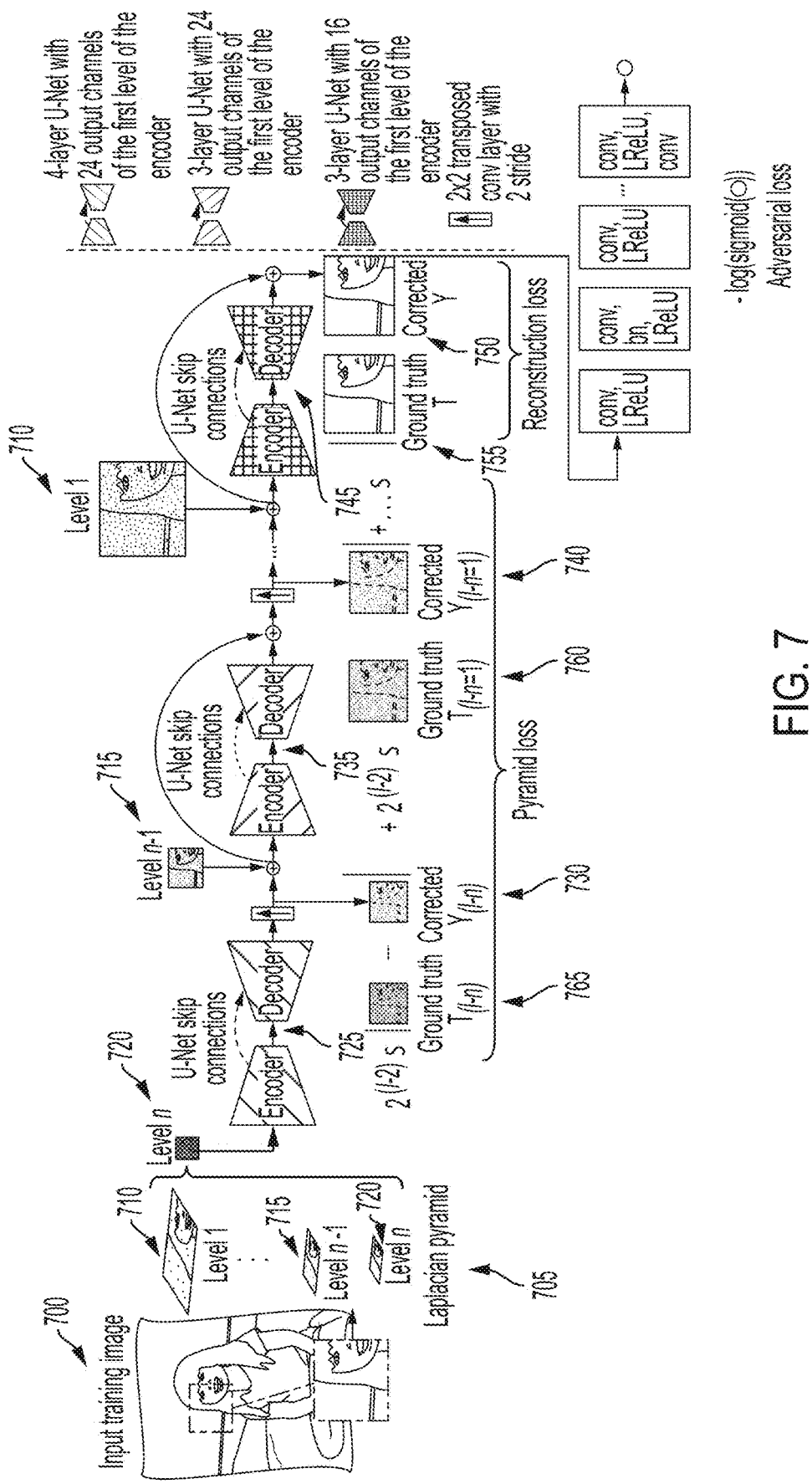
FIG. 7 is a diagram of an example system for training a network for correcting overexposed and underexposed images according to an embodiment.

Referring to FIG. 7, the server 220 may input an n-th level 720 of the input training image 700 into a first sub-network 725. The first sub-network 725 processes the low-frequency n-th level 720, and generates an n-th level output image 730. The server 220 may add the n−1th level 715 to the n-th level output image 730, and input the combination of the n−1th level 715 and the n-th level output image 730 into a second sub-network 735. Based on the input, the second sub-network 735 generates an n−1th output image 740. The server 220 may process subsequent levels of the Laplacian pyramid 705, and generate a first level output image 750 based on an output from an n-th sub-network 745.

The DNN may be trained by minimizing (or reducing) the following loss function:

$$\mathcal{L} = \mathcal{L}_{rec} + \mathcal{L}_{pyr} + \mathcal{L}_{adv}$$

As shown above, $\mathcal{L}_{rec}$ represents a reconstruction loss, $\mathcal{L}_{pyr}$ represents a pyramid loss, and $\mathcal{L}_{adv}$ represents an adversarial loss.

The reconstruction loss is a loss function that reduces a difference between the first level output image 750 output from the n-th sub-network 745 and a first level output image 755 corresponding to a properly exposed training image.

The reconstruction loss may be represented as follows:

$$\mathcal{L}_{rec} = \sum_{p=1}^{3hw} |Y(p) - T(p)|$$

As shown above, Y represents the output image 750 generated by the n-th sub-network 745 based on an input training image 700, and T represents the output image 755 generated by the n-th sub-network 745 based on an input properly exposed training image. Further, h denotes the height of the input training image 700, and w denotes the width of the input training image 700. Further still, p represents an index of each pixel representing an RGB value in the first level output image 750.

The pyramid loss is a plurality of loss functions corresponding to the plurality of levels, and may be represented as follows:

$$\mathcal{L}_{pyr} = \sum_{l=2}^{n} 2^{(l-2)} \sum_{p=1}^{3h_l w_l} |Y_{(l)}(p) - T_{(l)}(p)|$$

As shown above, $Y_{(l)}$ represents an output image generated by an l-th sub-network based on the input training image 700 (e.g., output images 730 and 740), and $T_{(l)}$ represents an output image generated by an l-th sub-network based on the input properly exposed training image (e.g., output images 760 and 765). The pyramid loss function provides a principled interpretation of the task of each sub-network, and also results in less visual artifacts as compared to training using only the reconstruction loss function.

The adversarial loss is a loss function that enhances the reconstruction of the output image in terms of realism and appeal. The adversarial loss may be represented as follows:

$$\mathcal{L}_{adv} = -3hwn \log(\mathcal{S}(\mathcal{D}(Y)))$$

As shown above, $\mathcal{S}$ represents a sigmoid function, and $\mathcal{D}$ represents a discriminator DNN that is trained together with the DNN described above.

Although FIG. 6 shows example operations, the method may include additional operations, fewer operations, different operations, or differently arranged operations than those depicted in FIG. 6. Additionally, or alternatively, two or more of the operations of the method may be performed in parallel.

FIG. 7 is a diagram of an example system for training a network for correcting overexposed and underexposed images according to an embodiment.

Figure 8:
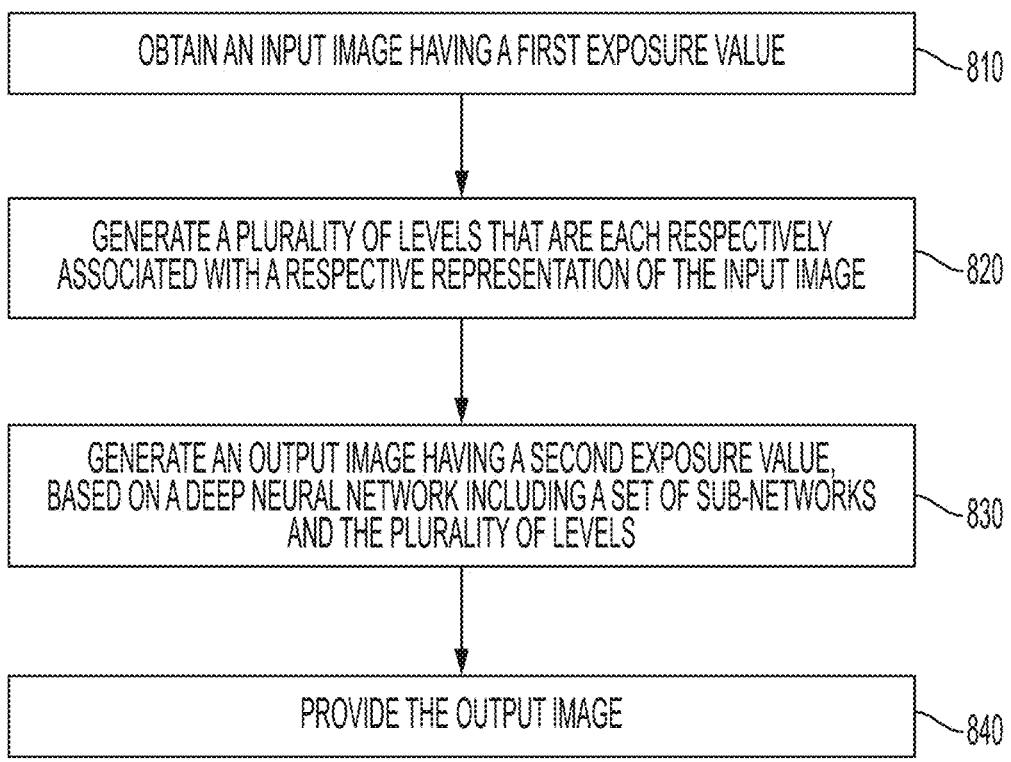
FIG. 8 is a flowchart of generating an output image using a network according to an embodiment.

FIG. 8 is a flowchart of generating an output image using a network according to an embodiment. According to some embodiments, one or more operations of FIG. 8 may be performed by the user device 210. Additionally, or alternatively, one or more operations may be performed by the server 220.

As shown in FIG. 8, the process may include obtaining an input image having a first exposure value (operation 810). As further shown in FIG. 8, the process may include generating a plurality of levels that are each respectively associated with a respective representation of the input image (operation 820). As further shown in FIG. 8, the process may include generating an output image having a second exposure value, based on a deep neural network including a set of sub-networks and the plurality of levels (operation 830). As further shown in FIG. 8, the process may include providing the output image (operation 840).

Although FIG. 8 shows example operations, the method may include additional operations, fewer operations, different operations, or differently arranged operations than those depicted in FIG. 8. Additionally, or alternatively, two or more of the operations of the method may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for generating an output image, the method comprising:
    obtaining an input image having a first exposure value;
    generating n levels that are respectively categorized according to a different frequency level of the input image, wherein n is a natural number greater than 1;
    generating the output image having a second exposure value by sequentially inputting each of the n levels into each of n sub-networks in a deep neural network (DNN), wherein a combination of an output of a k−1th sub-network of the DNN and a k-th level of the DNN is input to a k-th sub-network of the DNN, wherein k is a natural number greater than 1 and less than or equal to n; and
    providing the output image.

2. The method of claim 1, wherein the DNN is trained using a plurality of training images that correspond to a same underlying image, and that respectively include different exposure values.

3. The method of claim 2, wherein the n sub-networks of the DNN are trained using n levels that respectively correspond to the plurality of training images, and that are respectively categorized according to a different frequency level of respective training images.

4. The method of claim 3, wherein the DNN is trained using a first loss function that reduces a difference between the plurality of training images and respective outputs of the DNN.

5. The method of claim 4, wherein each sub-network of the DNN is trained using a set of second loss functions that reduce respective differences between a plurality of Laplacian pyramids and respective outputs of the n sub-networks.

6. The method of claim 5, wherein the DNN is trained using a third loss function that is an adversarial loss function.

7. The method of claim 2, wherein the different exposure values are set based on at least one of a market requirement, a customer preference, and a device setting.

8. A device for generating an output image, the device comprising:
    a memory configured to store instructions; and
    a processor configured to execute the instructions to:
        obtain an input image having a first exposure value;
        generate n levels that are respectively categorized according to a different frequency level of the input image, wherein n is a natural number greater than 1;
        generate the output image having a second exposure value by sequentially inputting each of the n levels into each of n sub-networks in a deep neural network (DNN), wherein a combination of an output of a k−1th sub-network of the DNN and a k-th level of the DNN is input to a k-th sub-network of the DNN, wherein k is a natural number greater than 1 and less than or equal to n; and
        provide the output image.

9. The device of claim 8, wherein the DNN is trained using a plurality of training images that correspond to a same underlying image, and that respectively include different exposure values.

10. The device of claim 9, wherein the n sub-networks of the DNN are trained using n levels that respectively correspond to the plurality of training images, and that are respectively categorized according to a different frequency level of respective training images.

11. The device of claim 10, wherein the DNN is trained using a first loss function that reduces a difference between the plurality of training images and respective outputs of the DNN.

12. The device of claim 11, wherein each sub-network of the DNN is trained using a set of second loss functions that reduce respective differences between a plurality of Laplacian pyramids and respective outputs of the n sub-networks.

13. The device of claim 12, wherein the DNN is trained using a third loss function that is an adversarial loss function.

14. The device of claim 9, wherein the different exposure values are set based on at least one of a market requirement, a customer preference, and a device setting.

15. A non-transitory computer-readable medium storing instructions, the instructions comprising: one or more instructions that, when executed by one or more processors of a device for generating an output image, cause the one or more processors to:
 obtain an input image having a first exposure value;
 generate n levels that are respectively categorized according to a different frequency level of the input image, wherein n is a natural number greater than 1;
 generate the output image having a second exposure value by sequentially inputting each of the n levels into each of n sub-networks in a deep neural network (DNN), wherein a combination of an output of a k−1th sub-network of the DNN and a k-th level of the DNN is input to a k-th sub-network of the DNN, wherein k is a natural number greater than 1 and less than or equal to n; and
 provide the output image.

16. The non-transitory computer-readable medium of claim 15, wherein the DNN is trained using a plurality of training images that correspond to a same underlying image, and that respectively include different exposure values.

17. The non-transitory computer-readable medium of claim 16, wherein the n sub-networks of the DNN are trained using n levels that respectively correspond to the plurality of training images, and that are respectively categorized according to a different frequency level of respective training images.

18. The non-transitory computer-readable medium of claim 17, wherein the DNN is trained using a first loss function that reduces a difference between the plurality of training images and respective outputs of the DNN.

19. The non-transitory computer-readable medium of claim 18, wherein each sub-network of the DNN is trained using a set of second loss functions that reduce respective differences between a plurality of Laplacian pyramids and respective outputs of the n sub-networks.

20. The non-transitory computer-readable medium of claim 19, wherein the DNN is trained using a third loss function that is an adversarial loss function.

* * * * *